Figure 1:
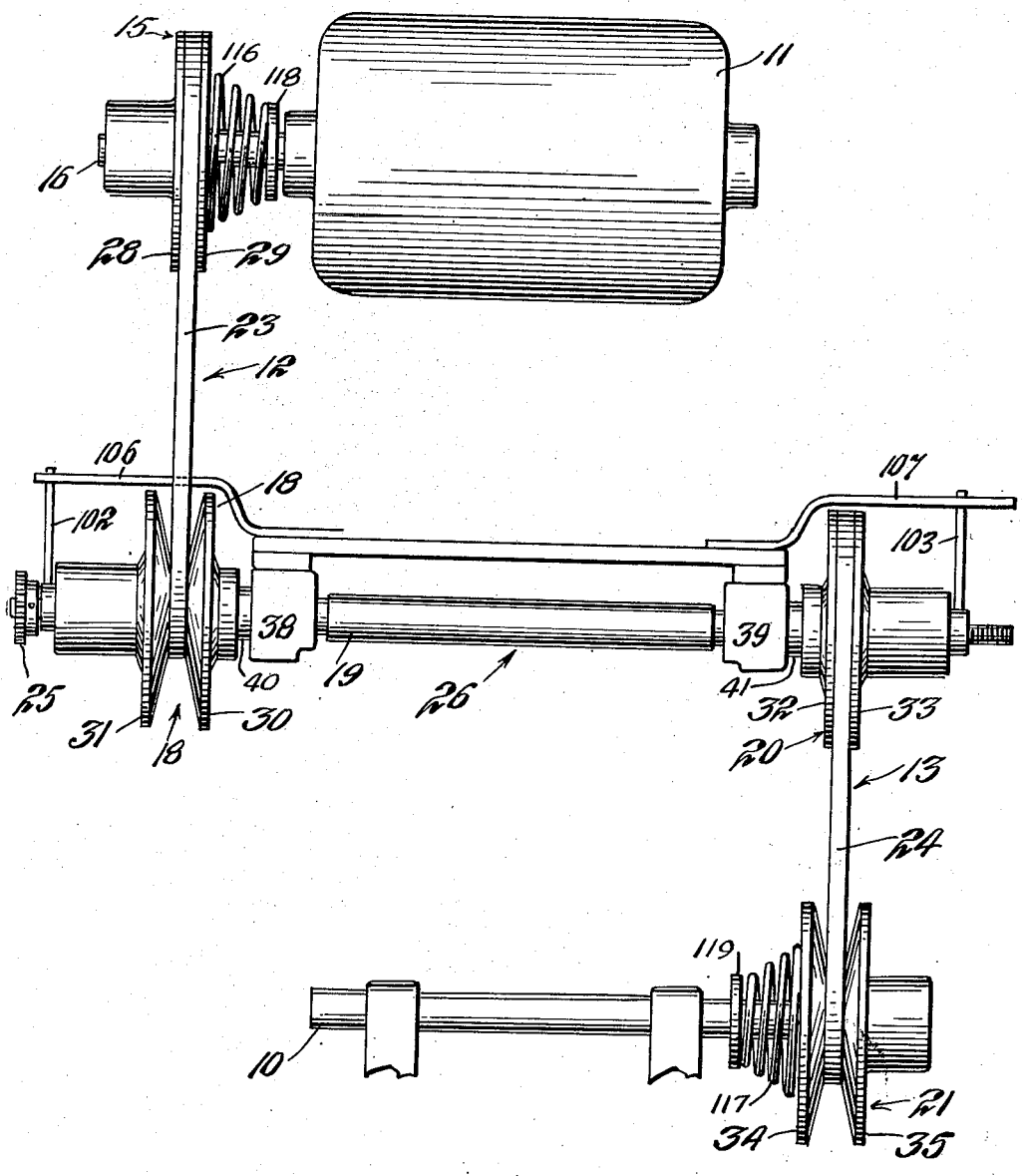

Oct. 23, 1956

W. M. SCHWEICKART 2,767,591

VARIABLE SPEED DRIVE

Filed Oct. 8, 1952

2 Sheets-Sheet 1

INVENTOR.
WILLIAM M. SCHWEICKART

BY Frank A. Bauer
ATTORNEY

Oct. 23, 1956  W. M. SCHWEICKART  2,767,591
VARIABLE SPEED DRIVE
Filed Oct. 8, 1952  2 Sheets-Sheet 2
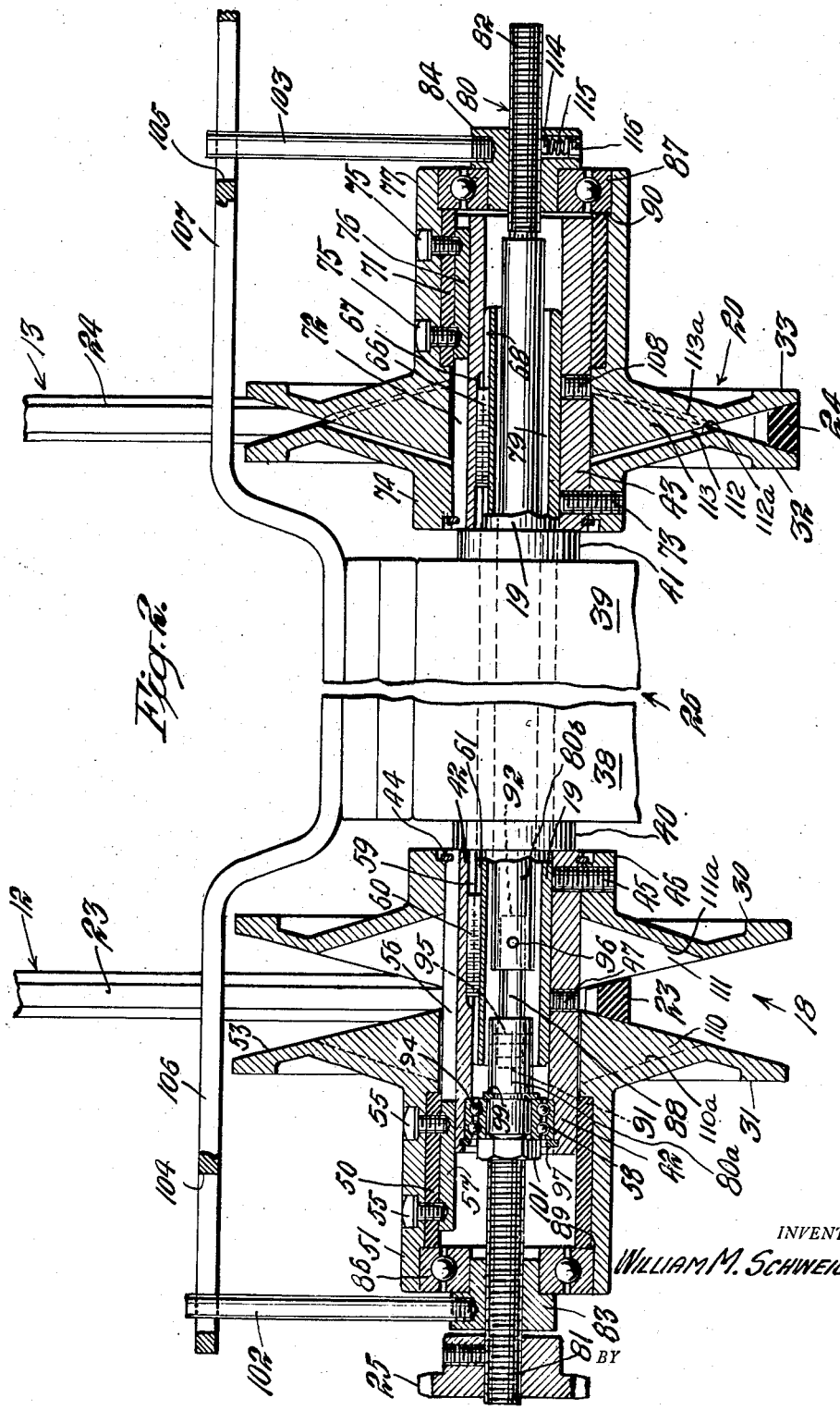
INVENTOR.
WILLIAM M. SCHWEICKART
BY

United States Patent Office 2,767,591
Patented Oct. 23, 1956

2,767,591

VARIABLE SPEED DRIVE

William M. Schweickart, Mentor, Ohio

Application October 8, 1952, Serial No. 313,650

6 Claims. (Cl. 74—230.17)

This invention relates to a variable speed transmission of the belt and pulley type.

An object of the invention is to provide a transmission that provides at the output a stepless variation of speed over a wide range.

Another object of the invention is to provide a variable speed transmission that has a very sensitive control of the speed without the drifting of the speed from a given setting.

Another object of the invention is to provide a variable speed transmission of the belt and pulley type in which the speed may be adjusted by a single control.

Another object of the invention is to provide a variable speed transmission having two sets of belt and pulley drives connected in series and the output speed adjusted from a single control.

Another object of the invention is to provide a variable speed transmission having two sets of belt and pulley drives with a minimum of back lash and play in the adjusting mechanism interconnecting the two drives.

Another object of the invention is to provide a variable speed transmission of the belt and pulley type which may vary the speed over a range having a ratio of 50:1 and a drift speed from a given setting within the range of less than 1%.

Other and further objects and advantages of the invention will be apparent from the following description taken in connection with the accompanying drawings in which:

Fig. 1 is a plan view of the variable drive assembly; and
Fig. 2 is a detailed sectional view of the speed adjuster.

Referring to the drawings, the output shaft 10 is driven by the electric motor 11 or other suitable source of rotative power through the two sets of variable speed belt and pulley transmissions 12 and 13 connected in series. The variable speed belt and pulley transmissions 12 and 13 each comprise a spring loaded variable pitch diameter pulley, an adjustable pitch diameter pulley and a V-belt connecting the two pulleys. The pulleys are preferably of the cone type with intermeshing surfaces. In the transmission 12, the spring loaded pulley 15 is mounted on the motor shaft 16 and the adjustable pulley 18 is keyed to a rotatable jackshaft 19. The adjustable pulley 20 of the transmission 13 is also mounted on the jackshaft 19 and is driven by the pulley 18 through the shaft. The spring loaded pulley 21 of transmission 13 is mounted on the output shaft 10. The spring loaded pulley 15 drives the adjustable pulley 18 through the V-belt 23 and the adjustable pulley 20 drives the output spring loaded pulley 21 through the V-belt 24.

The adjustable pulleys 18 and 20 are keyed to the common shaft 19 and the pitch diameters of the pulleys are adjusted by the knob 25 of the speed adjuster 26. The speed adjuster is shown in detail in Fig. 2. By turning the knob 25, the sheaves of one adjustable pulley separate, decreasing the pitch diameter and the sheaves of the other adjustable pulley close, increasing the pitch diameter. The corresponding spring loaded pulleys respond to the increase or decrease in the respective pitch diameters and thus increase or decrease the ratio of the speed of the motor to the output shaft.

The belt 23 rides in the separable sheaves 28, 29 of pulley 15 and the separable sheaves 30, 31 of pulley 18. As the distance of the separable sheaves 30, 31 is varied, the belt 23 varies the distance between the sheaves 28, 29 to permit the belt to move in and out from the center. The belt 24 rides in the separable sheaves 32, 33 of pulley 20 and the separable sheaves 34, 35 of the pulley 21. The variation of the pitch diameter of the pulley 20 by the adjustment of the sheaves 32, 33 will inversely change the pitch diameter of the sheaves 34, 35.

Considering the speed adjusting mechanism in detail as shown in Fig. 2, the jackshaft 19 interconnecting the transmissions 12 and 13 is securely mounted in the bearings or pillow blocks 38, 39. The lock collars 40, 41 are securely fastened to the shaft to bear against the bearings 38, 39 respectively and to thus hold the jackshaft 19 and the adjustable pulleys 18 and 20 in a fixed axial relation with a minimum of axial or longitudinal play. The jackshaft is rotatable in the bearings or pillow blocks and the pulleys are keyed to the jackshaft through the sleeves 42, 43 and rotate with it.

The pulley 18 comprises a fixed sheave 30 and a movable sheave 31 mounted on the splined sleeve 42. The sleeve 42 is mounted on the end of the jackshaft and bears against the lock collar 40. A set screw 47 is threaded through the sleeve and bears against the jackshaft to hold the sleeve against the collar and prevent axial movement of the sleeve. With the set screw recessed in the sleeve the movement of the sheave 31 is not obstructed by the set screw. The sleeve has a snap ring collar 44 fitting in a groove in the outer surface of the sleeve and protruding circumferentially around the sleeve to provide a shoulder against which the sheave 30 is positioned. The fixed sheave 30 is securely mounted on the sleeve 42 by the set screw 45 passing through the hub 46 and threaded in the sleeve. The movable sheave 31 is slideably mounted on the sleeve 42 and has a short longitudinal key 57 in the groove 56. The hub 51 of the movable sheave extends axially to permit the axial movement of the sheave 31 to and from the fixed sheave 30.

A sintered bronze bushing 50 is fitted inside of the cast hub 51 of the sheave 31. The bushing 50 is slideably mounted on the end of the sleeve 42 and in the low pitch diameter setting extends axially beyond the end of the sleeve 42. The bushing 50 and sheave 31 rotate with sleeve 42 by means of the key 57 riding in the groove 56 in the sleeve. The key 57 and bushing 50 are secured to the hub 51 by the bolts 55. The sheave end of the key is spaced from the belt gripping surface 53 to permit the two sheaves to overlap on an increase of the pitch diameter of the pulley.

The sleeve 42 fits on the jackshaft 19 and extends beyond the end of the shaft to hold the ball bearing 58. The key 60 fits into the slots 59, 61 of the sleeve 42 and jackshaft 19 respectively and turns the sleeve 42 with the shaft 19.

The pulley 20 on the transmission 13 is preferably of identical construction as pulley 18 and has a fixed sheave 32 and a movable sheave 33 each mounted on the opposite end of the jackshaft 19 from the sleeve 42 and secured to rotate with the shaft by the key 66 fitting in the groove 67 of the inner bore of the sleeve 43 and the groove 68 of the outer shaft of the jackshaft 19 respectively. A set screw 108 is recessed below the outer surface so as not to obstruct the movement of the sheave 33 on the sleeve 43. The set screw is threaded in the sleeve and sets against the jackshaft 19 to longitudinally hold the sleeve 43 in position. The sheave 32 is held in fixed axial relation with the sleeve 43 and the shaft 19 by the bolt 73. Bolt 73 passes through the hub 74 of the sheave 32 and is threaded in the sleeve 43 fitting in the hub to securely fasten sheave 32 and sleeve 43. The hub 74 is adjacent to pillow block 39 so that the surface of the fixed sheaves 30 and 32 face in opposite directions. The sleeve 43 is also rigidly secured to the jackshaft 19 by screw 108 threaded in the sleeve 43 and recessed within the outer surface of the sleeve. The sheave 33 is mounted to axially move on the sleeve 43 to and from sheave 32 and turns with sleeves 40 and 43. The sheave 33 has a sintered bronze bushing 71 fitting in the inner bore of hub 77. A key 76 fitting in the groove 72 is secured to the hub by the bolts 75 passing through the hub 77 and the bushing 71 and threaded in the key 76.

The jackshaft 19 is tubular with a cylindrical passage 79 extending its entire length. A tie-rod 80 extends through the jackshaft and has threaded portions 81, 82 at each end with the pitch of the threads in the same direction to move the threaded collars 83, 84 in the same direction when the shaft 80 is turned by the knob 25. The knob can be located at either end of the tie rod depending on the convenience of the operator. The threaded collars 83 and 84 are threaded on the portions 81, 82 and engage ball bearings 86, 87 mounted in the ends of the hubs 51, 77 and adjacent the bushings 50, 71 respectively. The bushings form shoulders 89, 90 respectively against which the bearings 86, 87 are pressed by the threaded collars 83, 84. An adjustable drag control is preferably provided to prevent the creep of the tie-rod from the drag caused by the rotation of the ball bearings 86, 87. The brass washer 114 is pressed against the threaded portion 82 by the spring 115 and set screw 116 for adjusting the pressure of the spring and the amount of the drag.

The tie-rod 80 is supported by the collars 83, 84 and the bearing 58 fitting into the end of the sleeve 42 and engaging the shoulder 94. Snap ring 97 fits into a groove in the sleeve 42 to hold the bearing 58 therein. The tie-rod has a snap ring 99 fitting in groove in the surface and protruding to engage the inner race of the bearing 58. The other end of the tie-rod is supported only by the bearing 87.

The tie or control rod 80 is divided into flexible segments 80a, 80b by a universal joint between the bearing 58 and the collar 84. The joint is formed by a link 88 fitting in slots 91, 92 in adjacent ends of the segments 80a, 80b respectively, and pivotally secured to the respective ends by the pins 95, 96. The pins are transverse to one another to provide the universal flexing of the control rod. The control rod 80 is held in three bearings 87, 86, 58.

The universal joint accommodates the control rod to any slight misalignment of the bearings and reduces the tendency of the control rod to creep with the turning of the pulleys.

In the assembly of the speed adjuster, the tie-rod 80 may be inserted in the mounted jackshaft 19 with the sleeves 42, 43 keyed and fastened thereto. The bearing 58 may be journaled on the tie-rod and positioned against the snap ring 99. The snap ring 97 may then be fitted in place to axially position the tie-rod 80. The locknut 101 is then turned on the threaded portion 81 and seated against the inner race of the bearing 58. The locknut axially holds the tie-rod in position and holds the control rod securely in the ball bearing.

The threaded collars 83, 84 are prevented from turning by the torque arms 102, 103 threaded tightly in the collars and extending to fit into slots 104, 105 in the fixed brackets 106, 107 attached to the casing or bearings 38, 39. As the threaded collars 83, 84 move longitudinally, the ends of the torque arms will correspondingly move in the slots 104, 105. The movable sheaves 31, 33; bearings 86, 87; threaded collars 83, 84; and torque arms 102, 103 are adjusted axially as a unit and move in the same direction along the shaft 80. Since the fixed sheaves 30, 32 are back to back, the space between the sheaves of one pulley will increase while the other is decreasing.

With the fixed sheaves 30, 32 back to back, the pressures of the V-belts on the faces are opposed and press the sleeves 42, 43 toward each other and against the lock collars 40, 41 respectively. The pressures against the surface of the movable sheaves are also opposite. These forces tend to hold the speed adjuster in balance. The faces of the fixed sheaves and movable sheaves are at an angle to the V-belts and have mating slots and fins so that the inner portions of the sheave surfaces may overlap and increase the diameter of the area of contact of the V-belt and thereby increase the pitch diameter of the pulley. The opposite sheaves 30 and 31 have fins 111, 110 intermeshing with slots 111a, 110a respectively. The sheaves 32 and 33 are similar with fins 112, 113 fitting into grooves 112a, 113a. Thus the surfaces of the pulleys intermesh to increase the rates of variation in the pitch diameters.

The drive pulley 15 and the output pulley 21 are spring loaded and respond in pitch to the adjustments of pulleys 18 and 20. The pulleys 15, 21 have fixed sheaves 28, 35 respectively and movable sheaves 29, 34 respectively. The spring loaded movable sheaves 29, 34 are on the same side of the V-belts as the fixed sheaves of the adjustable pulleys. The spring loaded sheave then opposes the movable sheave of the adjustable pulley.

The movable sheaves 29, 34 have springs 116, 117 respectively pressing the movable sheaves toward the respective fixed sheave. Spring 116 is seated on the collar 118 fixed to the shaft 16. When the sheaves 30, 31 on the speed adjuster are drawn together, the belt 23 forces the sheaves 28, 29 apart and spring 116 is compressed against the collar 118. Similarly, on pulley 21, the spring 117 is seated against the fixed collar 119 and is compressed against the collar when the pitch diameter of pulley 21 is reduced. The pitch diameters of pulleys 15 and 21 vary inversely so that when the pitch diameter of one pulley increases, the pitch diameter of the other pulley decreases.

This speed control apparatus provides a wide range of speed variation with a high accuracy of control and a constant speed at a given setting. On a given unit, a range of 150 to 7500 R. P. M. may be obtained with a one quarter to one percent variation in speed for a given setting.

The speed adjuster provides a balanced system of control. There is no backlash or lost motion in the threaded collars and the ball bearings on the movable sheave hub. The V-belts apply a pressure in one direction on the movable sheaves and the threaded member and ball bearings. This direction of pressure is not reversed by increasing or decreasing the pitch diameters. The speed may be varied slowly and accurately throughout the range of speeds or may be moved rapidly without hunting or drifting of the setting.

Various modifications and changes may be made in the aforementioned described embodiment without departing from the scope of the invention.

I claim:

1. A balanced speed adjuster for a variable speed transmission of the belt and pulley type comprising a tubular shaft, two fixed sheaves mounted back to back on said shaft, complementary slideable sheaves positioned on said shaft facing said respective fixed sheaves, a rod passing through said tubular shaft and journaled at each end of the shaft to centrally support said rod, said rod having portions threaded in the same direction and extending beyond the ends of said shaft and extending beyond said slideable sheaves, adjusting means threaded on said threaded portions engaging said slideable sheaves to receive the endwise longitudinal pressure of said sheaves and simultaneously moving said sheaves in the same direction to increase the pitch diameter of one set of sheaves and decrease the pitch diameter of the other set of sheaves.

2. A balanced speed adjuster as claimed in claim 1 wherein said adjusting means comprises two collars each threaded on a respective threaded portion to move in the same direction on rotation of the rod, two fixed brackets each with a slot longitudinal with said rod and two torque arms one fastened to each of said collars and projecting into said longitudinal slots to prevent the rotation of the collars and permit the longitudinal movement of the collars.

3. A balanced speed transmission comprising a tubular shaft, means for intermediately rotatably supporting said shaft, two pulleys longitudinally spaced on said shaft and rigidly secured thereto and each pulley having a fixed sheave and a slideable sheave rotating with the shaft, said fixed sheaves positioned back-to-back and said slideable sheaves mounted facing a respective fixed sheave, a rod extending through said tubular shaft, means for securing said rod and shaft against relative longitudinal movement, adjusting means mounted on each end of said rod and engaging a respective slideable sheave and moving said slideable sheaves in the same direction on actuation of said rod to shift said slideable sheaves in the same direction so that the pitch diameter of one pulley increases while the pitch diameter of the other pulley decreases.

4. A balanced speed adjuster for a variable speed transmission of the belt and pulley type comprising two cone type pulleys each having a fixed sheave and a movable sheave slideable to and from the fixed sheave to change the pitch diameter of the pulley, a jackshaft having a bore therethrough and rotatably supported at intermediate points to form free end portions, sleeves mounted on said end portions and extending beyond the end of said jackshaft, said fixed sheaves mounted back-to-back each on a respective sleeve at the inner end thereof, said movable sheaves mounted on a respective sleeve to face a respective fixed sheave and slideable to and from a respective fixed sheave, a tie-rod in the bore of said jackshaft and having threaded portions extending beyond the ends of said jackshaft, locking means mounted in one of said sleeves and intermediately supporting said tie-rod in said jackshaft and securing said rod and jackshaft from relative longitudinal movement and means threaded on said threaded portions for receiving the endwise longitudinal pressure of said movable sheaves and for simultaneously moving said movable sheaves in the same direction along said tie-rod to increase the pitch diameter of one pulley and simultaneously decrease the pitch diameter of the other pulley.

5. A variable speed transmission comprising a rotary tubular shaft, two fixed sheaves and two complementary movable sheaves mounted on said shaft with the movable sheaves facing the respective fixed sheaves, said fixed sheaves mounted and keyed to said shaft in back-to-back relation and having V-belts between the fixed and movable sheaves, adjusting mechanism against which said movable sheaves are pressed by V-belts between the fixed and movable sheaves, said adjusting mechanism having a rod with threaded portions at each end extending through said shaft and beyond each end, bearings at the ends of said shaft supporting said rod, means threaded on the threaded portions of said rod bearing against said movable sheaves and balancing through the rod oppositely acting movable sheaves to maintain the pitch diameters at accurate settings and to simultaneously axially slide one movable sheave towards the complementary fixed sheave and the other of said movable sheaves away from said complementary fixed sheave to smoothly vary the pitch diameters of said fixed and movable sheaves.

6. A balanced speed transmission comprising a first shaft, two fixed sheaves longitudinally spaced on said first shaft and facing in opposite directions, two movable sheaves slideably mounted on said first shaft facing a respective fixed sheave to form two separate pulleys rotated by said first shaft, a second shaft concentric with said first shaft and extending between said movable sheaves, means for securing said first shaft and said second shaft against longitudinal movement, adjusting means on each end of said second shaft engaging a respective slideable sheave to move said slideable sheaves in the same direction on actuation of said second shaft to shift said slideable sheaves in the same direction so that the pitch diameter of one pulley increases and the pitch diameter of the other pulley decreases.

References Cited in the file of this patent

UNITED STATES PATENTS

| | | |
|---|---|---|
| 1,287,707 | Leary | Dec. 17, 1918 |
| 1,738,552 | Abbott | Dec. 10, 1929 |
| 2,181,567 | Johnson | Nov. 28, 1939 |
| 2,251,488 | Hucke | Aug. 5, 1941 |
| 2,262,197 | Otto | Nov. 11, 1941 |
| 2,433,150 | Palm | Dec. 23, 1947 |

FOREIGN PATENTS

| | | |
|---|---|---|
| 255,530 | Switzerland | Jan. 17, 1949 |